I. H. GOLDMAN.
MACHINE FOR FILLING TUBULAR PACKING RINGS.
APPLICATION FILED MAY 5, 1915.
1,180,711. Patented Apr. 25, 1916.
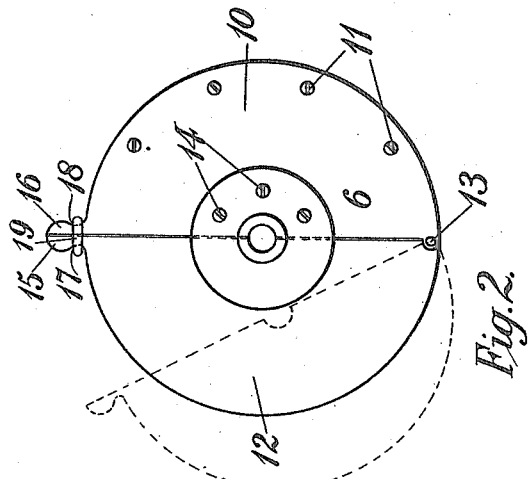
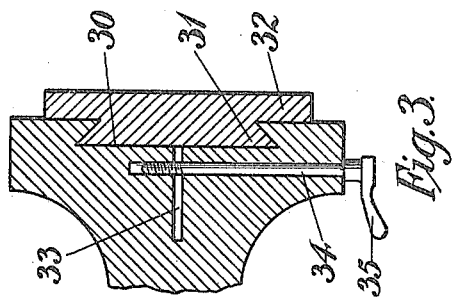
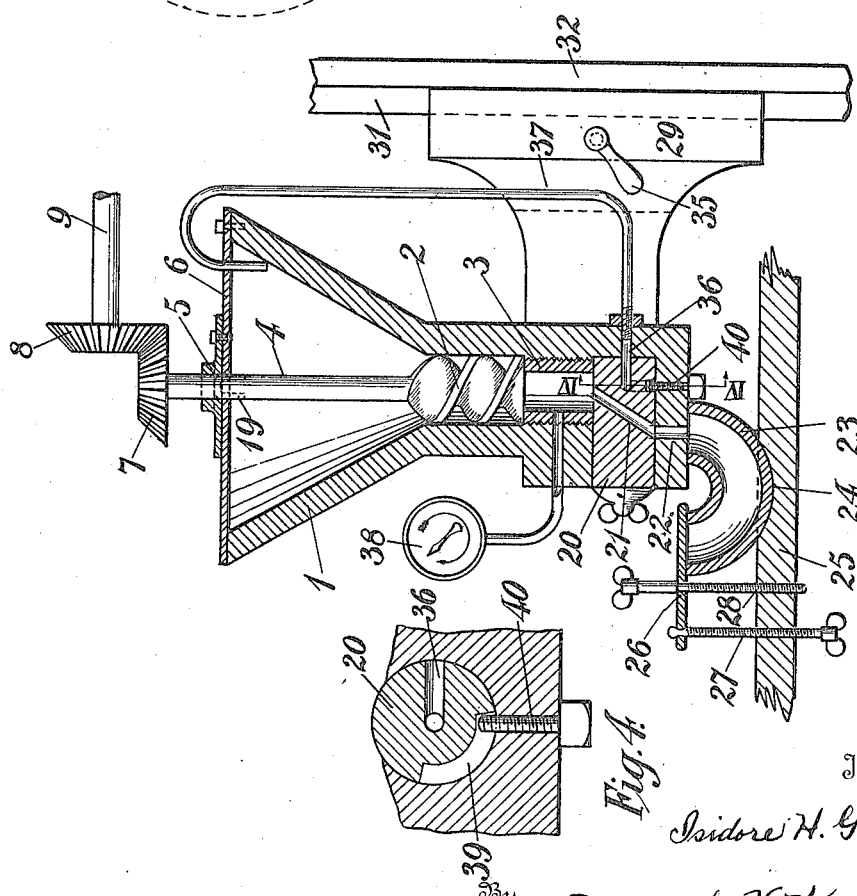
Inventor
Isidore H. Goldman,
By Frederick V. Winters,
Attorney

UNITED STATES PATENT OFFICE.

ISIDORE H. GOLDMAN, OF NEW YORK, N. Y.

MACHINE FOR FILLING TUBULAR PACKING-RINGS.

1,180,711.  Specification of Letters Patent.  Patented Apr. 25, 1916.

Application filed May 5, 1915. Serial No. 26,073.

*To all whom it may concern:*

Be it known that I, ISIDORE H. GOLDMAN, a citizen of the United States, residing at New York, in the county and State of New York, have invented certain new and useful Improvements in Machines for Filling Tubular Packing-Rings, of which the following is a full, clear, and exact specification.

This invention relates to the filling of semi-circular sections of tubular packing rings with plumbago or graphite, or other suitable materials. Such packing rings are tubes of soft metal such as alloys of lead, zinc, spelter and antimony. These tubes are bent to fit snugly around a piston rod of an engine and fit in the stuffing box to prevent the escape of steam. For convenience, a ring of this tubular packing is, in practice, cut into two equal semi-circular parts, these parts being put in the stuffing box so as to break joints. The semi-circular sections of tubular packing rings are filled with plumbago or other suitable material and after being filled are placed around the piston rod in the stuffing box as above explained, the tube containing said plumbago remaining as a part of the product or finished packing ring section. Heretofore these semi-circular sections of tubular packing rings have been filled by hand, and it has been difficult to pack the graphite or filling material close enough to completely fill said sections. When hollow spaces are left in the tubular sections, they cannot be bent evenly, as is sometimes required, so that the hand filled packing rings are often useless.

It is the object of the present invention to provide a machine for filling these packing rings, whereby increased pressure is available so that the tubular sections may be uniformly and completely filled.

Other objects will appear as the description proceeds.

The invention will be first hereinafter described in connection with the accompanying drawings, which constitute a part of this specification, and then more specifically defined in the claims at the end of the description.

In the accompanying drawings, wherein similar reference characters are used to designate corresponding parts throughout the several views: Figure 1 is a side elevation, partly in section, of a machine constructed in accordance with my invention. Fig. 2 is a plan view of the top or cover for the hopper. Fig. 3 is a horizontal section through the outer end portion of the adjustable support for the machine, showing how it may be clamped at different points along the vertical dove-tailed guide strip, and Fig. 4 is a section on the line 4—4 of Fig. 1.

The machine is provided with a hopper 1 having a worm feeding device 2 fitted in the throat thereof for forcing graphite or other material down through a tubular lining 3, which may be screwed into the base of the throat, and through a valve to a section of tubular packing ring arranged below the machine as will be hereinafter described. The worm 2 is carried by a shaft 4 extending vertically through the center of the hopper and journaled at 5 in a cover 6. Said shaft 4 carries a beveled pinion 7 meshing with a similar pinion 8 on a power shaft 9. The cover 6 is made in two sections, one section 10 thereof being rigidly secured or fastened to the top of the hopper by any suitable means, such as the bolts or screws 11, while the other section 12 is swiveled or hinged, as at 13, to the section 10, so that it may be swung outwardly in a horizontal plane for opening the hopper to permit a supply of graphite or other material to be placed therein. The journal 5 is secured to the stationary section 10 by bolts or screws 14, or other suitable means. The free end of the hinged section 12 is provided with a projecting lug 15 which abuts against a corresponding lug 16 on the stationary section. These lugs have reduced necks 17 and 18, respectively, over which a looped fastening device 19 may be slipped for retaining the hinged section in closed position.

Below the tubular lining 3 there is arranged a rotary valve 20 having a passage 21 adapted to establish communication between the base of the throat of the hopper and a passage 22 in the base of the machine. One of the semi-circular tubes is shown at 23 in Fig. 1 as seated in a groove 24 in a table or horizontal support 25. One end of the tube is arranged below the passage 22, while its other end is closed by a plate 26 adjustable by means of clamping screws 27 and 28 working through the table 25, for making a close fit between the plate and the end of the tube which it engages.

The machine, including the hopper and valve, is carried by a bracket 29 having a dove-tailed groove 30 fitting over a correspondingly shaped rib 31 arranged vertically on a fixture 32. The outer end portion of said bracket is split or slotted at 33, and a transverse bolt 34 having an operating handle 35 employed for clamping the grooved portion upon the rib 31, as clearly illustrated in Fig. 3. This construction permits of the machine being adjusted at different levels to accommodate semi-circular tubes of different sizes.

The valve 20 is provided with another passage 36 angular in form with one branch thereof disposed axially of the valve and communicating at all times with a pipe 37 extending up to and through the cover of the hopper. The other branch of the passage 36 opens on the peripheral surface of the valve about ninety degrees from the opening of the passage 21. When the semicircular tube 23 has been completely filled, as may be indicated by the pressure registered on the dial 38 which communicates with the interior of the tubular lining 3, the valve may be turned a quarter revolution from the position shown in Fig. 1, so as to bring the passage 36 into communication with the lower end of the throat of the hopper, and move the passage 21 out of register therewith. The machine may therefore be run continuously, the graphite or other material being conveyed through the passage 36 and pipe 37 back into the hopper during the intervals required for removing a filled tube and substituting another one to be filled.

In order to insure the proper registration of the passages 21 and 36 with the bottom of the throat of the hopper in the two positions of the valve, said valve may be provided with a groove 39, Figs. 1 and 4, which extends about one quarter of the way around the same and into which a screw or bolt 40 extends for limiting the rotation of the valve. The protruding head of the bolt 40 also serves as a positioning stop for the end of the semi-circular tube 23 which is arranged below the passage 22.

Having thus described my invention what I claim as new and desire to secure by Letters Patent of the United States is:

1. The combination with means for supporting a tubular packing ring section, of means for temporarily closing one end thereof, a hopper for plastic material, and mechanical means for forcing said plastic material from the hopper into the other end of the tubular section.

2. The combination with means for supporting a tubular packing ring section, of means for temporarily closing one end thereof, a hopper for filling material, mechanical means for forcing said material from said hopper into the other end of the tubular section, and means for diverting the flow of material and carrying it back to the hopper when the tubular section is filled.

3. The combination with means for supporting a tubular packing ring section, of means for temporarily closing one end thereof, a hopper for filling material, a power driven worm in the hopper for feeding the material into the other end of the tubular section, and means for diverting the flow of material and carrying it back to the hopper when the tubular section is filled.

4. The combination with means for supporting a tubular packing ring section, of means for temporarily closing one end thereof, a hopper for filling material, mechanical means for forcing said material from the hopper into the other end of the tubular section, a valve for controlling the passage of the material to the tubular section, and a return pipe leading from the valve back to the hopper for the purpose specified.

5. The combination with means for supporting a tubular packing ring section, of means for temporarily closing one end thereof, of a hopper for filling material, mechanical means for forcing said material from the hopper into the other end of the tubular section, means for diverting the flow of material and carrying it back to the hopper when the tubular section is filled with material, and means for indicating when the tubular section has been completely filled.

6. The combination with means for supporting a tubular packing ring section, of means for temporarily closing one end thereof, of a hopper for filling material, means for adjusting said hopper vertically with respect to the tubular section, and mechanical means for forcing the filling material from the hopper into the other end of said tubular section.

7. The combination with a table having a groove therein to seat a semi-circular tubular packing ring section, of a plate for covering one end of said tubular section, clamping screws working in the table and plate for securing said plate closely over said end of the tubular section, and means for filling said tubular section from the other end.

8. The combination with means for supporting a tubular packing ring section, of means for temporarily closing one end thereof, a hopper for filling material, mechanical means for forcing the material from the hopper into the other end of the tubular section, a valve having two passages therein, one adapted to communicate with the hopper and tubular section and the other adapted to communicate with the hopper but not with the tubular section, and a pipe leading from the second passage in the valve back into the hopper for the purpose specified.

9. The combination with a hopper, of a worm feeding device in said hopper, a shaft carrying said worm, a sectional cover for the hopper, one section of said cover being stationary and having a journal for the shaft, the other section of the cover being hinged to the stationary section, and means for retaining said hinged section in closed position.

10. The combination with a hopper, of a worm feeding device in said hopper, a shaft carrying the worm, a sectional cover for the hopper, one section being stationary, a journal for the shaft mounted on the stationary section of the cover, the other section of the cover being hinged to the stationary section to swing in the plane thereof, projecting lugs having reduced necks on the free end of the hinged section and the adjacent end of the other section, and a retaining loop to fit over the reduced necks of said lugs for the purpose specified.

11. The combination with a hopper, of mechanical means for forcing material from the hopper, means for supporting a receptacle in position to be filled with said material, a valve for controlling the flow of the material, said valve having an arcuate groove therein, and a bolt extending into said groove for limiting the movement of the valve, the projecting head of the bolt serving as a stop for positioning the receptacle to be filled.

12. The combination with means for supporting a tubular packing ring section, of means for temporarily closing one end thereof, a hopper for plastic material, and a power driven worm in the hopper for feeding the material into the other end of the tubular section.

In testimony whereof I have signed my name to this specification.

ISIDORE H. GOLDMAN.

Copies of this patent may be obtained for five cents each, by addressing the "Commissioner of Patents, Washington, D. C."